US012669102B2

(12) United States Patent
Leukart et al.

(10) Patent No.: US 12,669,102 B2
(45) Date of Patent: Jun. 30, 2026

(54) INJECTION NOZZLE, FUEL INJECTOR HAVING INJECTION NOZZLE

(71) Applicant: Robert Bosch GmbH, Stuttgart (DE)

(72) Inventors: Michael Leukart, Dusslingen (DE); Ferdinand Nicolai, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 244 days.

(21) Appl. No.: 18/551,669

(22) PCT Filed: Feb. 16, 2022

(86) PCT No.: PCT/EP2022/053761
§ 371 (c)(1),
(2) Date: Oct. 11, 2023

(87) PCT Pub. No.: WO2022/199947
PCT Pub. Date: Sep. 29, 2022

(65) Prior Publication Data

US 2024/0175415 A1 May 30, 2024

(30) Foreign Application Priority Data

Mar. 22, 2021 (DE) ..................... 10 2021 202 732.6

(51) Int. Cl.
*F02M 61/12* (2006.01)
*F02M 61/18* (2006.01)

(52) U.S. Cl.
CPC ........ *F02M 61/12* (2013.01); *F02M 61/1886* (2013.01)

(58) Field of Classification Search
CPC .... F02M 61/12; F02M 61/1886; F02M 61/08; F02M 61/045; B05B 1/3013
See application file for complete search history.

(56) References Cited

U.S. PATENT DOCUMENTS 3,511,443 A * 5/1970 Bishop .................... F02M 61/12 239/533.6
3,667,684 A * 6/1972 Baumgart .............. F02M 61/12 239/533.11

(Continued)

FOREIGN PATENT DOCUMENTS

CN 106460747 A 2/2017
DE 102012211156 A1 1/2014

(Continued)

OTHER PUBLICATIONS

Translation of International Search Report for Application No. PCT/EP2022/053761 dated May 18, 2022 (2 pages).

*Primary Examiner* — Joseph A Greenlund
(74) *Attorney, Agent, or Firm* — Michael Best & Friedrich LLP

(57) ABSTRACT

The invention relates to an injection nozzle (1) for injecting a fluid, in particular a liquid or gaseous fuel, comprising:

a nozzle body (2) which is designed to be hollow-cylindrical at least in portions and forms a sealing seat (3) via which a flow path (4) for the fluid to be injected leads, a nozzle needle (5) which is accommodated in the nozzle body (2) for reciprocating movement and has a sealing surface (6) that interacts with the sealing seat (3), a guide element (7) which is fixedly connected to the nozzle needle (5) and is guided by means of an external guide (8) of the nozzle body (2).

The invention further relates to a fuel injector having an injection nozzle (1) according to the invention.

11 Claims, 2 Drawing Sheets

(56) References Cited

U.S. PATENT DOCUMENTS 4,373,671 A * 2/1983 Giardini ............... F02M 65/003 239/585.5
4,427,151 A * 1/1984 Trenne ................... F02M 49/02 239/585.1
4,524,914 A 6/1985 Kaibara et al.
4,688,723 A * 8/1987 Kern .................. F02M 51/0639 239/391
4,813,599 A * 3/1989 Greiner .............. F02M 51/0692 239/456
4,964,391 A * 10/1990 Hoover .................. F02M 69/46 137/542
5,580,000 A * 12/1996 Kiuchi ................... F02M 51/08 239/585.4
5,755,385 A * 5/1998 Potz ..................... F02M 61/045 239/584
5,775,305 A * 7/1998 Bolger ................... F02M 49/02 123/497
5,988,213 A * 11/1999 Yoshioka ............. F02M 37/106 137/590
6,224,001 B1 * 5/2001 Cooke ................ F02M 51/0603 239/533.9
6,302,337 B1 * 10/2001 Kimmel ................. F02M 61/08 239/585.4
6,338,445 B1 * 1/2002 Lambert .............. F02M 61/182 239/585.5
6,467,702 B1 * 10/2002 Lambert .............. F02M 45/086 239/533.8
6,830,034 B2 * 12/2004 Engelmeyer ......... F02M 61/168 123/456
7,040,292 B2 * 5/2006 Bruehmann ......... F02M 55/005 123/456
8,893,989 B2 * 11/2014 Mueller ............. F02M 61/1893 239/533.13
8,955,775 B2 * 2/2015 Jansen ................. F02M 45/086 239/585.1
2004/0021010 A1 2/2004 Hohl et al.
2004/0061005 A1 * 4/2004 Hokao ............... F02M 61/1853 239/533.12
2010/0001215 A1 * 1/2010 Suzuki ............... F02M 51/0678 251/129.01
2010/0050990 A1 * 3/2010 Magel .................. F02M 61/167 123/456
2013/0284828 A1 * 10/2013 Mueller ................. F02M 61/12 239/584
2018/0283338 A1 * 10/2018 Soerensen .......... F02M 61/1853
2019/0078542 A1 * 3/2019 Wessner ............. F02M 63/0078
2019/0323468 A1 * 10/2019 Gartung ............. F02M 61/1853
2021/0239082 A1 * 8/2021 Dantes ............... F02M 61/1886
2023/0358196 A1 * 11/2023 Geberth ................. F02M 61/08
2024/0175415 A1 * 5/2024 Leukart .............. F02M 61/1886

FOREIGN PATENT DOCUMENTS

DE 102018208780 A1 12/2019
EP 2123899 A1 11/2009
EP 2386745 A1 * 11/2011 ............. F02M 61/06
EP 2642110 A 9/2013
EP 2642110 A1 * 9/2013 ............. F02M 61/12
EP 3165759 A1 5/2017

* cited by examiner

INJECTION NOZZLE, FUEL INJECTOR HAVING INJECTION NOZZLE

BACKGROUND

The invention relates to an injection nozzle for injecting a fluid, in particular a liquid or gaseous fuel. The invention further relates to a fuel injector with an injection nozzle according to the invention.

In the prior art, injection nozzles for liquid and/or gaseous fuels are described in a wide variety of embodiments, which generally comprise a nozzle body and a nozzle needle which is accommodated in the nozzle body for reciprocating movement, and whose reciprocating movements can be used to control injection openings formed in the nozzle body. The nozzle needle is guided along its longitudinal axis via guide surfaces formed in the nozzle body. The guide is intended to ensure a symmetrical spray pattern as well as to reduce wear in the area of a sealing seat for the nozzle needle. Sufficiently dimensioned longitudinal grooves or chamfers in the guide area of the nozzle needle ensure that, when the nozzle needle is opened, sufficient fluid can reach the seat area at high pressure and from there via a blind hole to the spray holes.

To guide the nozzle needle as precisely as possible, longer and/or multiple guides are often provided inside the nozzle body and on the nozzle needle. Given multiple guides, one is usually positioned as close as possible to the sealing seat in order to center the nozzle needle with respect to the sealing seat. Such a nozzle needle is known, for example, from DE 10 2012 211 156 A1. However, what are referred to as near-seat guides are difficult to achieve with regard to production technology so that, despite guiding, asymmetrical sliding of the nozzle needle along the sealing seat during closing cannot always be avoided. In addition, as the injection pressure increases, the guide gap can widen, so that it loses or forfeit its guiding properties.

In addition to guiding the nozzle needle, the fluid supply to the spray holes must be ensured. Since the flow path of the fluid passes over the same area or even directly over the guide areas, a compromise must be found here between the cross-sectional area through which the fluid can flow and the guiding properties. The cross-sectional area through which the flow can pass in the guide areas must be dimensioned in such a way that no additional restriction is formed. If possible, restriction points should only be formed by the sealing seat when opening the nozzle needle and by the spray holes during full stroke.

SUMMARY

The object of the present invention is to specify an injection nozzle with an improved guide for reciprocating movement of the nozzle needle. The guide should also have as little influence as possible on the fluid flow through the injection nozzle.

Proposed in order to achieve said object is the injection nozzle according to the disclosure. Further disclosed is a fuel injector having an injection nozzle according to the invention.

The injection nozzle proposed for injecting a fluid, in particular a liquid or gaseous fuel, comprises a nozzle body which is designed to be hollow-cylindrical at least in portions, and forms a sealing seat via which a flow path for the fluid to be injected leads, a nozzle needle which is accommodated in the nozzle body for reciprocating movement and has a sealing surface which interacts with the sealing seat, and a guide element which is fixedly connected to the nozzle needle and is guided by means of an external guide of the nozzle body.

Since the guide element is fixedly connected to the nozzle needle, the nozzle needle is also guided by means of the external guide of the nozzle body. The nozzle needle guide is thus relocated from the inside to the outside. This makes it possible to achieve guiding at the level of the sealing seat, or at least in the direct vicinity of the sealing seat so that the nozzle needle is guided optimally. Asymmetrical sliding of the nozzle needle over the sealing seat during closing is thus prevented, which in turn has the effect of reducing wear in the area of the sealing seat.

The close-seated guide also eliminates the need for further guides inside the nozzle body, so that a larger flow cross-section is available for the fluid flowing through. In this way, the fluid flow in the direction of the sealing seat is improved. In addition, the guide gaps can narrow as the injection pressure increases, so that they improve their guiding properties as the injection pressure increases.

By guiding the nozzle needle to the outside, a spatial separation of the flow path and the guide is achieved. In other words, the fluid no longer flows through the guide. Doing so enables the guiding to be designed only according to guiding properties, so that design is made easier. The external arrangement of the guide also has manufacturing advantages, as the area is easily accessible. Furthermore, complex undercuts and/or exposures, which are usual for forming a guide inside the nozzle body, can be omitted.

Preferably, the guide and the flow path are spatially separated by the nozzle body. In other words, the nozzle needle is still guided by means of the nozzle body and the nozzle body delimits the flow path, but spatially separated from one another, so that the guide does not restrict the flow path.

Further preferably, an outer peripheral area of the nozzle body forms the external guide. In particular, this can be an end portion of the nozzle body, which is machined accordingly for this purpose, for example fine ground. The guide element surrounds this exclamation area of the nozzle body. For this purpose, the guide element is preferably designed to be hollow-cylindrical at least in portions.

Further preferably, the guide element has a central recess in which an end portion of the nozzle needle is accommodated. In this way, a fixed connection between the guide element and the nozzle needle can be established. The nozzle needle and the guide element thus form a structural unit which is guided by means of the external guide of the nozzle body. The assembled version has the advantage that the nozzle needle and the guide element can be manufactured separately. At the same time, assembly is simplified because the guide element can also be connected to the nozzle needle only after the nozzle needle has been inserted into the nozzle body. This procedure has the advantage that any manufacturing tolerances in the area of the sealing seat can still be compensated for during the connection of the guide element to the nozzle needle. The guide element can be connected to the nozzle needle by means of a welded joint, for example.

It is further proposed that the guide element delimits a flow chamber and has at least one opening for discharging the fluid from the flow chamber. In this case, the guide element can be used at the same time to shape the spray pattern. For the at least one opening can be designed as desired. With the aid of the guide element, optimized beam shaping and/or beam steering can thus be achieved at the same time.

Since the flow chamber delimited by the guide element is significantly larger than, for example, a classic blind hole inside the nozzle body, significantly higher flow rates can also be achieved using the proposed injection nozzle. The prerequisite thereby is that the opening cross-section of the at least one opening for discharging the fluid is appropriately dimensioned, which at the same time prevents the formation of a throttling point downstream of the sealing seat.

Furthermore, the sealing seat and/or the sealing surface of the nozzle needle interacting with the sealing seat is/are preferably conically shaped. The conical shape enables the nozzle needle to self-center with respect to the sealing seat when closing, so that the injection nozzle closes securely. If both the sealing seat and the sealing surface of the nozzle needle are conically shaped, then both preferably have a different cone angle. Preferably, the cone angle of the sealing surface of the nozzle needle is smaller than the cone angle of the sealing seat. In this case, the nozzle needle comes into contact with the sealing seat via a circumferential circular sealing contour, which further increases the tightness of the sealing seat.

The sealing surface is preferably formed on a part or portion of the nozzle needle that has an enlarged outer diameter and is located upstream of the guided end portion. This enables a comparatively large seat diameter and thus high flow rates.

According to one preferred embodiment of the invention, the nozzle needle opens outward. This embodiment has the advantage that the sealing seat and the guide can be manufactured from one side in one clamping operation. This increases the precision of the alignment of the nozzle seat to the guide. In addition, the guide can be arranged at the level of the sealing seat.

Alternatively, it is proposed that the nozzle needle opens inward. In this case, the guide element can only be fixedly connected to the nozzle needle after the nozzle needle has been inserted into the nozzle body. The built design of the nozzle needle in this case proves to be particularly advantageous.

Further proposed is a fuel injector having an injection nozzle according to the invention. Since the injection nozzle is suitable for injecting liquid and gaseous fuels, the fuel injector can, e.g., be a diesel injector for a common rail injection system or a gas injector. Since gas injectors must generally enable high volume flow rates, the advantages of the injection nozzle according to the invention are particularly effective in this case.

BRIEF DESCRIPTION OF THE DRAWINGS

Preferred embodiments of the invention are described in greater detail hereinafter with reference to the accompanying drawings. Shown are.

DETAILED DESCRIPTION

Figure 1:
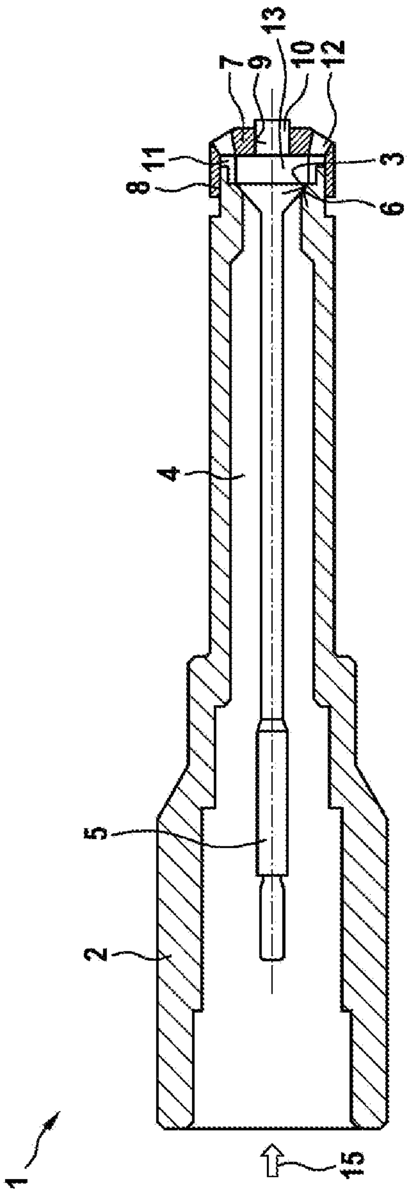
FIG. 1 a schematic longitudinal section through a first injection nozzle according to the invention, and FIG. 2 a schematic longitudinal section through a second injection nozzle according to the invention.

FIG. 1 shows a first preferred embodiment of an injection nozzle 1 according to the invention. This comprises a nozzle body 2 in which a nozzle needle 5 is movably accommodated. The nozzle body 2 and the nozzle needle 5 delimit a flow path 4 for a fluid being injected. The flow path 4 passes over a sealing seat 3 formed by the nozzle body 2. The sealing seat 3 is conically shaped and oriented outward. In a portion 13 with an enlarged outer diameter, the nozzle needle 5 has a conically shaped sealing surface 6 that interacts with the sealing seat 3. The sealing surface 6 is oriented towards the nozzle body 2. Accordingly, the nozzle needle 5 opens outward (see arrow 15).

To guide the nozzle needle 5, the nozzle body 2 has a guide 8 in an outer peripheral area. The guide 8 is surrounded by a guide element 7, which is fixedly connected to the nozzle needle 5. A central recess 9 is provided in the guide element 7 for this purpose, in which a pin-shaped end portion 10 of the nozzle needle 5 is accommodated. The guide element 7 delimits a flow chamber 11 downstream of the sealing seat 3, into which the fluid being injected flows when the nozzle needle 5 is open. In order to discharge the fluid from the flow chamber 11, the guide element 7 has openings 12 which are shaped in such a way that flow deflection is achieved at the same time.

In the injection nozzle 1 shown in FIG. 1, the nozzle needle 5 is guided on the outside of the nozzle body 2, so that a close-fitting guide inside the nozzle body 2 is unnecessary. The flow cross-section in flow path 4 can thus be designed to the maximum. In particular, the formation of a choke point is avoided. Since the guide 8 formed on the outside of the nozzle body 2 is arranged outside the flow path 4, it can be optimized in terms of its guiding properties. Furthermore, the guide 8 can be arranged at the level of the sealing seat 3 so that the nozzle needle 5 is guided optimally.

Figure 2:
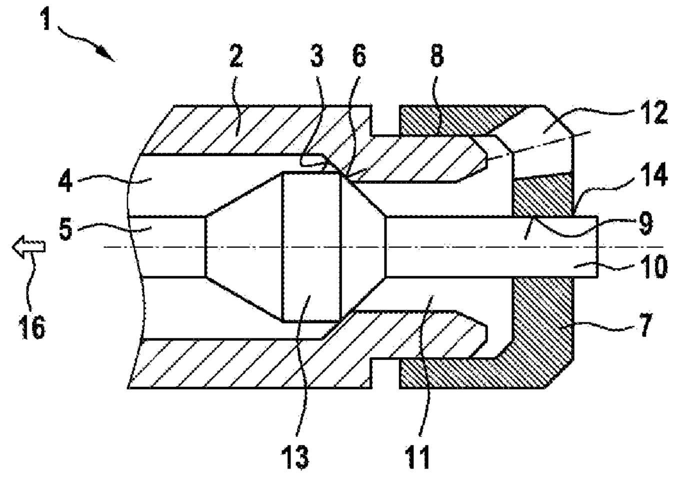

A further preferred embodiment of an injection nozzle 1 according to the invention is shown in FIG. 2. This differs from the embodiment of FIG. 1 in particular in that the nozzle needle 5 opens inward (see arrow 16). Consequently, the sealing seat 3 of the nozzle body 2 is oriented inward. The sealing surface 6 of the nozzle needle 5 interacting with the sealing seat 3 faces outward. Here, too, the nozzle needle 5 is connected to a guide element 7 which engages around a guide 8 formed on the outer periphery of the nozzle body. In the present case, the connection is made via a welded joint 14 between the nozzle needle 5 and the guide element 7 in the area of a pin-shaped end portion 10 of the nozzle needle 5 engaging in a recess 9 of the guide element 7.

The advantages of the injection nozzle 1 according to the invention described above are also achieved with an inward-opening nozzle needle 5, so that the invention can be implemented optionally with an outward-opening and an inward-opening nozzle needle 5.

The invention claimed is:

1. An injection nozzle (1) for injecting a fluid, the injection nozzle comprising:

a nozzle body (2) which is configured to be hollow-cylindrical at least in portions and forms a sealing seat (3) via which a flow path (4) for the fluid to be injected leads, a nozzle needle (5) which is accommodated in the nozzle body (2) for reciprocating movement and has a sealing surface (6) that interacts with the sealing seat (3), wherein the nozzle needle (5) is fixedly connected to a guide element (7), the guide element (7) is guided by an external guide (8) of the nozzle body (2) for movement relative to the nozzle body (2), wherein the guide element (7) includes a wall that delimits a flow chamber (11) and the wall comprises at least one opening (12) for discharging the fluid from the flow chamber (11).

2. The injection nozzle (1) according to claim 1, wherein the external guide (8) and the flow path (4) are spatially separated by the nozzle body (2).

3. The injection nozzle (1) according to claim 1, wherein an outer peripheral area of the nozzle body (2) forms the external guide (8), and the guide element (7) surrounds the outer peripheral area of the nozzle body (2).

4. The injection nozzle (1) according to claim 1, wherein the guide element (7) comprises a central recess (9) in which an end portion (10) of the nozzle needle (5) is accommodated.

5. The injection nozzle (1) according to claim 1, wherein the sealing seat (3) and/or the sealing surface (6) that interacts with the sealing seat (3) is/are conically shaped.

6. The injection nozzle (1) according to claim 1, wherein the sealing surface (6) is formed on a portion (13) of the nozzle needle (5) that has an enlarged outer diameter.

7. The injection nozzle (1) according to claim 1, wherein the nozzle needle (5) opens outwards.

8. The injection nozzle (1) according to claim 1, wherein the nozzle needle (5) opens inwards.

9. A fuel injector having an injection nozzle (1) according to claim 1.

10. The injection nozzle (1) according to claim 1, wherein the fluid is a liquid or gaseous fuel.

11. The injection nozzle (1) according to claim 4, wherein the end portion (10) of the nozzle needle (5) is configured as a pin.

* * * * *